(12) United States Patent
Menzies et al.

(10) Patent No.: US 12,495,132 B2
(45) Date of Patent: *Dec. 9, 2025

(54) TECHNIQUES FOR DISPLAYING AND CAPTURING IMAGES

(71) Applicant: Apple Inc., Cupertino, CA (US)

(72) Inventors: Alexander Menzies, Menlo Park, CA (US); Tobias Rick, Mountain View, CA (US); Alexandre Da Veiga, San Francisco, CA (US); Bryce L Schmidtchen, San Francisco, CA (US); Vedant Saran, Campbell, CA (US); Bryan Cline, Sunnyvale, CA (US); Michael I Weinstein, Greenbrae, CA (US); Tsao-Wei Huang, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/060,516

(22) Filed: Feb. 21, 2025

(65) Prior Publication Data

US 2025/0193361 A1 Jun. 12, 2025

Related U.S. Application Data

(63) Continuation of application No. 18/948,235, filed on Nov. 14, 2024, which is a continuation of application (Continued)

(51) Int. Cl.
*G06T 5/00* (2024.01)
*G06T 5/50* (2006.01)
(Continued)

(52) U.S. Cl.
CPC ............... *H04N 13/20* (2018.05); *G06T 5/50* (2013.01); *G06T 11/60* (2013.01); *G06T 2207/20221* (2013.01)

(58) Field of Classification Search
CPC ......... G06T 19/006; G06T 7/70; G06F 3/011; G06F 3/017; G06F 3/04815; G06F 3/012; G06V 20/20; G06V 10/764
See application file for complete search history.

(56) References Cited

U.S. PATENT DOCUMENTS 6,315,197 B1 11/2001 Beardsley et al.
9,838,667 B2 12/2017 Fujita
(Continued)

FOREIGN PATENT DOCUMENTS

CN 114022586 2/2022
JP 2008141518 6/2008
(Continued)

OTHER PUBLICATIONS

Alam, Md Fasiul, et al. "Augmented and virtual reality based monitoring and safety system: A prototype IoT platform." Journal of Network and Computer Applications 89 (2017): 109-119.*

*Primary Examiner* — Li Liu
(74) *Attorney, Agent, or Firm* — Brownstein Hyatt Farber Schreck, LLP

(57) ABSTRACT

Embodiments disclosed herein are directed to devices, systems, and methods for separately processing an image stream to generate a first set of images for display by a set of displays and a second set of images for storage or transfer as part of a media capture event. Specifically, a first set of images from an image stream may be used to generate a first set of transformed images, and these transformed images may be displayed on a set of displays. A second set of images may be selected from the image stream in response to a capture request associated with a media capture event, and the second set of images may be used to generate a second set of transformed images. A set of output images may be generated from the second set of transformed images, and
(Continued)

the set of output images may be stored or transmitted for later viewing.

20 Claims, 7 Drawing Sheets

Related U.S. Application Data

No. 18/661,336, filed on May 10, 2024, now Pat. No. 12,206,830.

(60) Provisional application No. 63/470,081, filed on May 31, 2023.

(51) Int. Cl.
*G06T 11/60* (2006.01)
*H04N 13/20* (2018.01)

(56) References Cited

U.S. PATENT DOCUMENTS

| | | | |
|---|---|---|---|
| 10,244,226 B2 | 3/2019 | Weaver et al. | |
| 10,292,769 B1 * | 5/2019 | Yu | G06T 7/593 |
| 10,832,427 B1 | 11/2020 | Eble et al. | |
| 11,206,364 B1 | 12/2021 | Price et al. | |
| 11,373,271 B1 | 6/2022 | Da Silva Quelhas et al. | |
| 11,481,960 B2 * | 10/2022 | Marra | G06T 15/20 |
| 11,662,841 B1 | 5/2023 | Knoppert et al. | |
| 2002/0049728 A1 | 4/2002 | Kaku | |
| 2004/0165063 A1 | 8/2004 | Iida | |
| 2008/0131107 A1 | 6/2008 | Ueno | |
| 2014/0293006 A1 | 10/2014 | Masuda | |
| 2014/0368670 A1 | 12/2014 | Morley et al. | |
| 2015/0002607 A1 | 1/2015 | Border et al. | |
| 2016/0104035 A1 | 4/2016 | Wang et al. | |
| 2017/0061693 A1 * | 3/2017 | Kohler | G06T 19/006 |
| 2017/0337693 A1 * | 11/2017 | Baruch | G06T 7/12 |
| 2018/0285651 A1 | 10/2018 | Dey et al. | |
| 2022/0091722 A1 * | 3/2022 | Faulkner | G06F 3/04815 |
| 2022/0092862 A1 * | 3/2022 | Faulkner | G06V 40/28 |
| 2023/0215003 A1 | 7/2023 | Tsujimoto | |

FOREIGN PATENT DOCUMENTS

| | | |
|---|---|---|
| JP | 2014228727 | 5/2013 |
| KR | 102423552 | 7/2022 |
| KR | 20230075187 | 5/2023 |
| WO | WO2013/004721 | 1/2013 |
| WO | WO2013/47217 | 4/2013 |
| WO | WO2013/094332 | 6/2013 |
| WO | WO2017/118662 | 7/2017 |

* cited by examiner

TECHNIQUES FOR DISPLAYING AND CAPTURING IMAGES

CROSS-REFERENCE TO RELATED APPLICATIONS

This application is a continuation patent application of U.S. patent application Ser. No. 18/948,235, filed Nov. 14, 2024 and titled "Techniques for Displaying and Capturing Images," which is a continuation patent application of U.S. patent application Ser. No. 18/661,336, filed May 10, 2024 and titled "Techniques for Displaying and Capturing Images," which is a nonprovisional patent application of and claims the benefit of U.S. Provisional Patent Application No. 63/470,081, filed May 31, 2023 and titled "Techniques for Displaying and Capturing Images," the disclosures of which are hereby incorporated herein by reference in their entireties.

FIELD

The described embodiments relate generally to separately processing an image stream for real-time display and media capture event.

BACKGROUND

Extended reality systems can be used to generate partially or wholly simulated environments (e.g., virtual reality environments, mixed reality environments, or the like) in which virtual content can replace or augment the physical world. The simulated environments may provide engaging experiences for a user, and are used in gaming, personal communication, virtual travel, healthcare and many other contexts. In some instances, the simulated environment may include information captured from the user's environment. For example, a passthrough mode of an extended reality system may display, using one or more displays of the extended reality system, images of a user's physical environment. This may allow a user to perceive their physical environment via the display(s) of the extended reality system.

The images of the user's environment may be captured using one or more cameras of the extended reality system. Depending on the positioning of a camera in the extended reality system, point-of-view differences between the user and the camera may, if not corrected, cause the images displayed in a passthrough mode to not accurately reflect the user's physical environment. This may cause user discomfort or may negatively impact user experience during a passthrough mode.

SUMMARY

Embodiments described herein are directed to systems, devices, and methods for performing separate image processing. Some embodiments are directed to a method that includes capturing, using a set of cameras of a device, an image stream, generating a first set of transformed images from the image stream by applying a first transformation operation to images of the image stream, and displaying, at a set of displays of a device, the first set of transformed images. The method further includes receiving a capture request and generating, in response to receiving the capture request, a set of stereo output images. Generating the set of stereo output images includes selecting a set of images from the image stream, generating a second set of transformed images from the set of images by applying a second transformation operation different than the first transformation operation to the set of images, and generating, using the second set of transformed images, the set of stereo output images.

In some variations of these methods, generating the set of stereo output images includes generating a fused stereo output image from two or more image pairs of the set of images. Additionally or alternatively, the set of stereo output images includes a stereo video. In some of these variations, generating the set of stereo output images includes performing a video stabilization operation on the second set of transformed images.

In some instances, the first transformation operation is a perspective correction operation. Additionally or alternatively, the second transformation operation may be an image rectification operation. Generating the set of stereo output images may include generating metadata associated with the set of stereo output images. The metadata may include field of view information of the set of cameras, pose information for the set of stereo output images, and/or a set of default disparity values for the set of stereo output images. In some instances, generating metadata associated with the set of stereo output images includes selecting the set of default disparity values based on a scene captured by the set of stereo output images. In some variations, adding virtual content to the first set of transformed images.

Some embodiments are directed to a device that includes a set of cameras, a set of displays, a memory, and one or more processors operatively coupled to the memory, wherein the one or more processors are configured to execute instructions causing the one or more processors to perform any of the above methods. Similarly, still other embodiments are directed to a non-transitory computer-readable medium includes instructions, which when executed by at least one computing device, cause the at least one computing device to perform operations including the steps of any of the above methods.

Still other embodiments are directed to a method that includes capturing, using a first camera and a second camera of a device, a first set of image pairs of a scene. Each image pair of the first set of image pairs comprises a first image captured by the first camera and a second image captured by the second camera. The method includes generating a first set of transformed image pairs from the first set of image pairs, wherein generating the first set of transformed image pairs includes, for each image pair of the first set of image pairs, generating a first perspective-corrected image from the first image based on a difference between a point-of-view of the first camera and a point-of-view of a user, and generating a second perspective-corrected image from the first image based on a difference between a point-of-view of the second camera and the point-of-view of the user. The method further includes displaying, on a set of displays of the device, the first set of transformed image pairs.

Additionally, the method includes receiving a capture request, selecting, in response to receiving the capture request, a second set of image pairs from the first set of image pairs, and generating a second set of transformed image pairs from the second set of image pairs. This includes, for each image pair of the first set of image pairs: generating a first de-warped image from the first image, generating a second de-warped image from second first image, and aligning the first and second de-warped images. The method includes generating a set of output images using the second set of transformed image pairs.

In some variations of these methods, generating the set of output images includes generating a fused stereo output image from two or more image pairs of the set of transformed image pairs. Additionally or alternatively, the set of stereo output images includes a stereo video formed from the second set of transformed images pairs. In some of these variations, generating the set of stereo output images includes performing a video stabilization operation on the second set of transformed image pairs.

Generating the set of stereo output images may include generating metadata associated with the set of stereo output images. The metadata may include field of view information of at least one of the first camera or the second camera, pose information for the set of output images, and/or a set of default disparity values for a set of stereo images of the stereo output images. In some instances, generating metadata associated with the set of stereo output images includes selecting the set of default disparity values based on a scene captured by the set of output images. In some variations, adding virtual content to the first set of transformed image pairs.

Some embodiments are directed to a device that includes a first camera, a second, a set of displays, a memory, and one or more processors operatively coupled to the memory, wherein the one or more processors are configured to execute instructions causing the one or more processors to perform any of the above methods. Similarly, still other embodiments are directed to a non-transitory computer-readable medium includes instructions, which when executed by at least one computing device, cause the at least one computing device to perform operations including the steps of any of the above methods.

In addition to the example aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1:
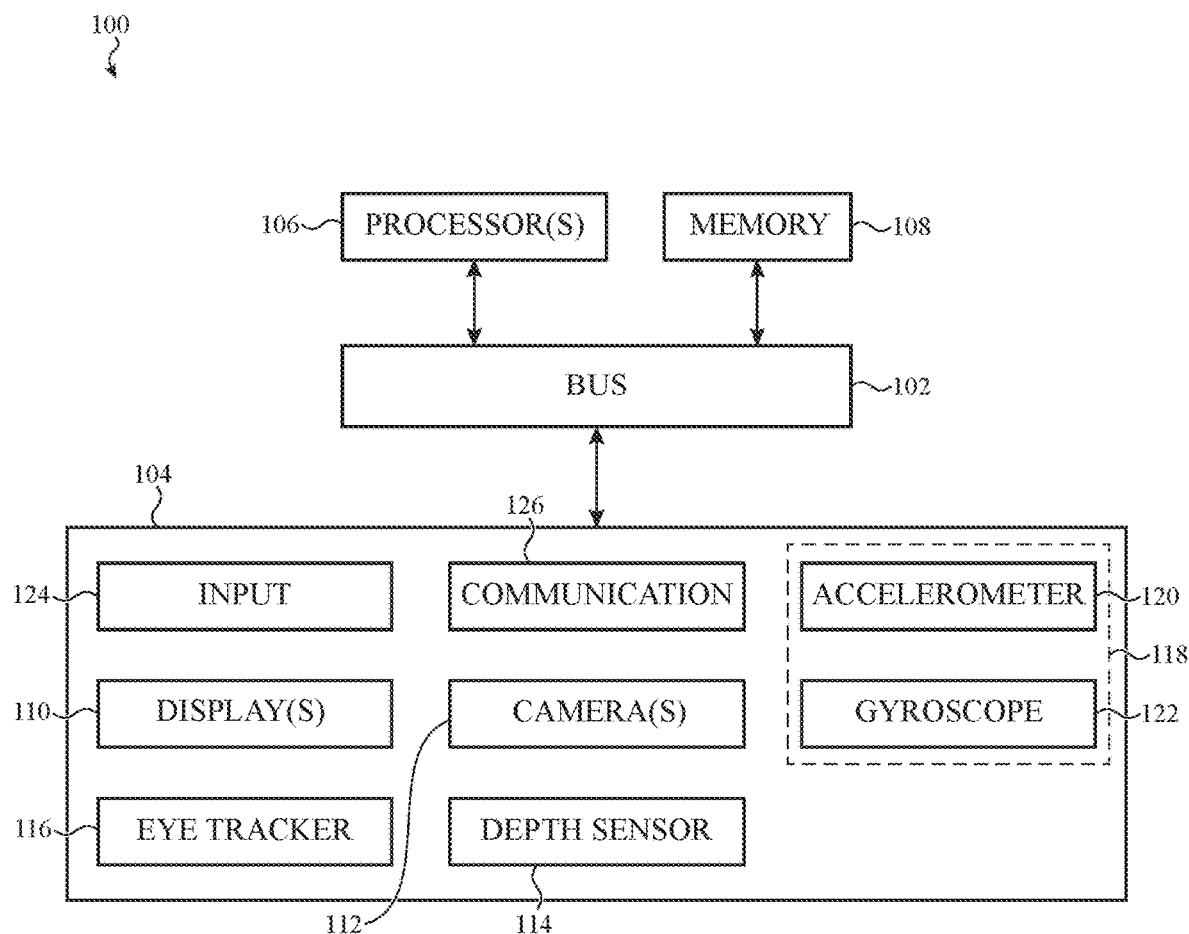
FIG. 1 shows a block diagram of an example electronic device that may be used in the extended reality systems described herein.

It should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments disclosed herein are directed to devices, systems, and methods for separately processing an image stream to generate a first set of images for display by a set of displays and a second set of images for storage or transfer as part of a media capture event. Specifically, a first set of images from an image stream may be used to generate a first set of transformed images, and these transformed images may be displayed on a set of displays. A second set of images may be selected from the image stream in response to a capture request associated with a media capture event, and the second set of images may be used to generate a second set of transformed images. A set of output images may be generated from the second set of transformed images, and the set of output images may be stored or transmitted for later viewing.

These and other embodiments are discussed below with reference to FIGS. 1-7. However, those skilled in the art will readily appreciate that the detailed description given herein with respect to these Figures is for explanatory purposes only and should not be construed as limiting.

The devices and methods described herein may be utilized as part of an extended reality system in which an extended reality environment is generated and displayed to a user. Various terms are used herein to describe the various extended reality systems and associated extended reality environments described herein. For example, as used herein, a "physical environment" is a portion of the physical world/real world around a user that the user may perceive and interact with without the aid of the extended reality systems described herein. For example, a physical environment may include a room of a building or an outdoor space, as well as any people, animals, or objects (collectively referred to herein as "real-world objects") in that space, such as plants, furniture, books, or the like.

As used herein, an "extended reality environment" refers to a wholly or partially simulated environment that a user may perceive and/or interact with using an extended reality system as described herein. In some instances, an extended reality environment may be a virtual reality environment, which refers to a wholly simulated environment in which the user's physical environment is completely replaced with virtual content within the virtual reality environment. The virtual reality environment may not be dependent on the user's physical environment, and thus may allow the user to perceive that they are in a different, simulated location (e.g., standing at a beach when they are actually standing in a room of a building). The virtual reality environment may include virtual objects (e.g., simulated objects that may be perceived by the user but are not actually present in the physical environment) with which the user may interact.

In other instances, an extended reality environment may be a mixed reality environment, a wholly or partially simulated environment in which virtual content may be presented along with a portion of a user's physical environment.

Specifically, a mixed reality environment may include a reproduction and/or a modified representation of one or more portions of the user's physical environment surrounding the extended reality system. In this way, the user may be able to perceive (directly or indirectly) their physical environment through the mixed reality environment while also still perceiving the virtual content.

As used herein, a "reproduction" of a portion of a physical environment refers to a portion of an extended reality environment that recreates that portion of the physical environment within the extended reality environment. For example, the extended reality system may include one or more cameras that are able to capture images of the physical environment. The extended reality system may present a portion of these images to a user by displaying them via an opaque display, such that the user indirectly views the physical environment via the displayed images. Additionally, in some instances the extended reality environment is displayed using foveated rendering, in which different portions of the extended reality environment are rendered using different levels of fidelity (e.g., image resolution) depending on a direction of a user's gaze. In these instances, portions of a reproduction that are rendered at lower fidelity using these foveated rendering techniques are still considered reproductions for the purposes of this application.

As used herein, a "modified representation" of a portion of a physical environment refers to a portion of an extended reality environment that is derived from the physical environment, but intentionally obscures one or more aspects of the physical environment. Whereas an indirect reproduction attempts to replicate a portion the user's physical environment within the extended reality environment, a modified representation intentionally alters one or more visual aspects of a portion of the user's physical environment (e.g., using one or more visual effects such an artificial blur). In this way, a modified representation of a portion of a user's physical environment may allow a user to perceive certain aspects of that portion of the physical environment while obscuring other aspects. In the example of an artificial blur, a user may still be able to perceive the general shape and placement of real-world objects within the modified representation, but may not be able perceive the visual details of these objects that would otherwise be visible in the physical environment. In instances where the extended reality environment is displayed using foveated rendering, portions of a modified representation that are in peripheral regions of the extended reality environment (relative to the user's gaze) may be rendered at lower fidelity using foveated rendering techniques.

Reproductions and/or modified representations of a user's physical environment may be used in a variety of extended reality environments. For example, an extended reality system may be configured to operate in a "passthrough" mode, during which the extended reality system generates and presents an extended reality environment that includes a reproduction of a portion of the user's physical environment. This allows the user to indirectly view a portion of their physical environment, even if one or more components of the extended reality system (e.g., a display) may interfere with the user's ability to directly view the same portion of their physical environment. When an extended reality system is operating in a passthrough mode, some or all of the extended reality environment may include a reproduction of the user's physical environment. In some instances one or more portions of the extended reality environment may include virtual content and/or modified representations of the user's physical environment, in addition to the reproduction of the user's physical environment. Additionally or alternatively, virtual content (e.g., graphical elements of a graphical user interface, virtual objects) may be overlaid over portions of the reproduction.

Generally, the extended reality systems described herein include an electronic device that is capable of capturing and displaying images to a user. FIG. 1 depicts a block diagram of an example electronic device 100 that may be part of an extended reality system as described herein. The electronic device 100 may be configured to capture, process, and display images as part of an extended reality environment. In some implementations, the electronic device 100 is a handheld electronic device (e.g., a smartphone or a tablet) configured to present an extended reality environment to a user. In some of these implementations, the handheld electronic device may be temporarily attached to an accessory that allows the handheld electronic device to be worn by a user. In other implements, the electronic device 100 is a head-mounted device (HMD) that a user wears.

In some embodiments, the electronic device 100 has a bus 102 that operatively couples an I/O section 104 with one or more computer processors 106 and memory 108, and includes circuitry that interconnects and controls communications between components of the electronic device 100. I/O section 104 includes various system components that may assist with the operation of the electronic device 100. The electronic device 100 includes a set of displays 110 and a set of cameras 112. The set of cameras 112 may capture images of the user's physical environment (e.g., a scene), and may use these images in generating an extended reality environment (e.g., as part of a passthrough mode) as described herein. The set of displays 110 may display the extended reality environment such that the user may view it, thereby allowing the user to perceive their physical environment via the electronic device 100. The set of displays 110 may include a single display, or may include multiple displays (e.g., one display for each eye of a user). Each display of the set of displays may utilize any suitable display technology, and may include, for example, a liquid-crystal display (LCD), an organic light emitting diode (OLED) display, a light emitting diode (LED) display, a quantum dot light emitting diode (QLED) display, or the like.

The memory 108 of the electronic device 100 can include one or more non-transitory computer-readable storage devices. These non-transitory computer-readable storage devices may be used to store computer-executable instructions, which, when executed by one or more computer processors 106, can cause the computer processors to perform the processes that are described herein (the various image capture and processing techniques described below). Additionally, non-transitory computer-readable storage devices may be used to store images captured as part of a media capture event as described herein.

A computer-readable storage device can be any medium that can tangibly contain or store computer-executable instructions for use by or in connection with an instruction execution system, apparatus, or device (e.g., the one or more processors 106). In some examples, the storage device is a transitory computer-readable storage medium. In some examples, the storage device is a non-transitory computer-readable storage medium. The non-transitory computer-readable storage device can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

The one or more computer processors 106 can include, for example, a processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute an operating system and applications of the electronic device 100, as well as to facilitate capturing, processing, displaying, and storing of images as described herein.

Accordingly, any of the processes described herein may be stored as instructions on a non-transitory computer-readable storage device, such that a processor may utilize these instructions to perform the various steps of the processes described herein. Similarly, the devices described herein include a memory (e.g., memory 108) and one or more processors (e.g., processor 106) operatively coupled to the memory. The one or more processors may receive instructions from the memory and are configured to execute these instructions to perform the various steps of the processes described herein. Any of the processes described herein may be performed, using the devices described herein, as a method of capturing and displaying images.

In some implementations, the electronic device 100 includes a set of depth sensors 114 (which may include a single depth sensor or multiple depth sensors), each of which is configured to calculate depth information for a portion of the environment in front of the electronic device 100. Specifically, each of the set of depth sensors 114 may calculate depth information within a field of coverage (e.g., the widest lateral extent to which that depth sensor is capable of providing depth information). In some instances, the field of coverage of one of the set of depth sensors 114 may at least partially overlap a field of view (e.g., the spatial extent of a scene that a camera is able to capture using an image sensor of the camera) of at least one of the set of cameras 112, thereby allowing the depth sensor to calculate depth information associated with the field of view(s) of the set of cameras 112.

Information from the depth sensors may be used to calculate the distance between the depth sensor and various points in the environment around the electronic device 100. In some instances, depth information from the set of depth sensors 114 may be used to generate a depth map as described herein. The depth information may be calculated in any suitable manner. In one non-limiting example, a depth sensor may utilize stereo imaging, in which two images are taken from different positions, and the distance (disparity) between corresponding pixels in the two images may be used to calculate depth information. In another example, a depth sensor may utilize structured light imaging, whereby the depth sensor may image a scene while projecting a known illumination pattern (typically using infrared illumination) toward the scene, and then may look at how the pattern is distorted by the scene to calculate depth information. In still another example, a depth sensor may utilize time of flight sensing, which calculates depth based on the amount of time it takes for light (typically infrared) emitted from the depth sensor to return from the scene. A time-of-flight depth sensor may utilize direct time of flight or indirect time of flight, and may illuminate an entire field of coverage at one time or may only illuminate a subset of the field of coverage at a given time (e.g., via one or more spots, stripes, or other patterns that may either be fixed or may be scanned across the field of coverage). In instances where a depth sensor utilizes infrared illumination, this infrared illumination may be utilized in a range of ambient conditions without being perceived by a user.

In some implementations, the electronic device 100 includes an eye tracker 116. The eye tracker 116 may be configured to determine the position of a user's eyes relative to the electronic device 100 (or a particular component thereof). The eye tracker 116 may include any suitable hardware for identifying and locating the eyes of a user, such as one or more cameras, depth sensors, combinations thereof or the like. In some instances, the eye tracker 116 may also be configured to detect a location/direction of a user's gaze. It should be appreciated that eye tracker 116 may include a single module that is configured to determine the position of both of a user's eyes, or may include multiple units, each of which is configured to determine the position of a corresponding eye of the user.

Additionally or alternatively, the electronic device 100 may include a set of sensors 118 that are capable of determining motion and/or orientation of the electronic device 100 (or particular components thereof). For example, the set of sensors 118 shown in FIG. 1 include an accelerometer 120 and a gyroscope 122. Information from the set of sensors 118 may be used to calculate pose information for the electronic device 100 (or particular components thereof). This may allow the electronic device 100 to track its position and orientation as the electronic device 100 is moved. Additionally or alternatively, information captured by the set of cameras 112 and/or the set of depth sensors 114 may be used to calculate pose information for the electronic device 100 (or particular components thereof), for example by using simultaneous localization and mapping (SLAM) techniques.

In addition, the electronic device 100 can include a set of input mechanisms 124 that a user may manipulate to interact with and provide inputs to the extended reality system (e.g., a touch screen, a softkey, a keyboard, a virtual keyboard, a button, a knob, a joystick, a switch, a dial, combinations thereof, or the like). The electronic device 100 can include a communication unit 126 for receiving application and operating system data, using Wi-Fi, Bluetooth, near field communication (NFC), cellular, and/or other wireless communication techniques. The electronic device 100 is not limited to the components and configuration of FIG. 1, but can include other or additional components (e.g., GPS sensors, directional sensors such a compass, physiological sensors, microphones, speakers, haptics engines, or the like) in multiple configurations as may be desired.

Figure 2:
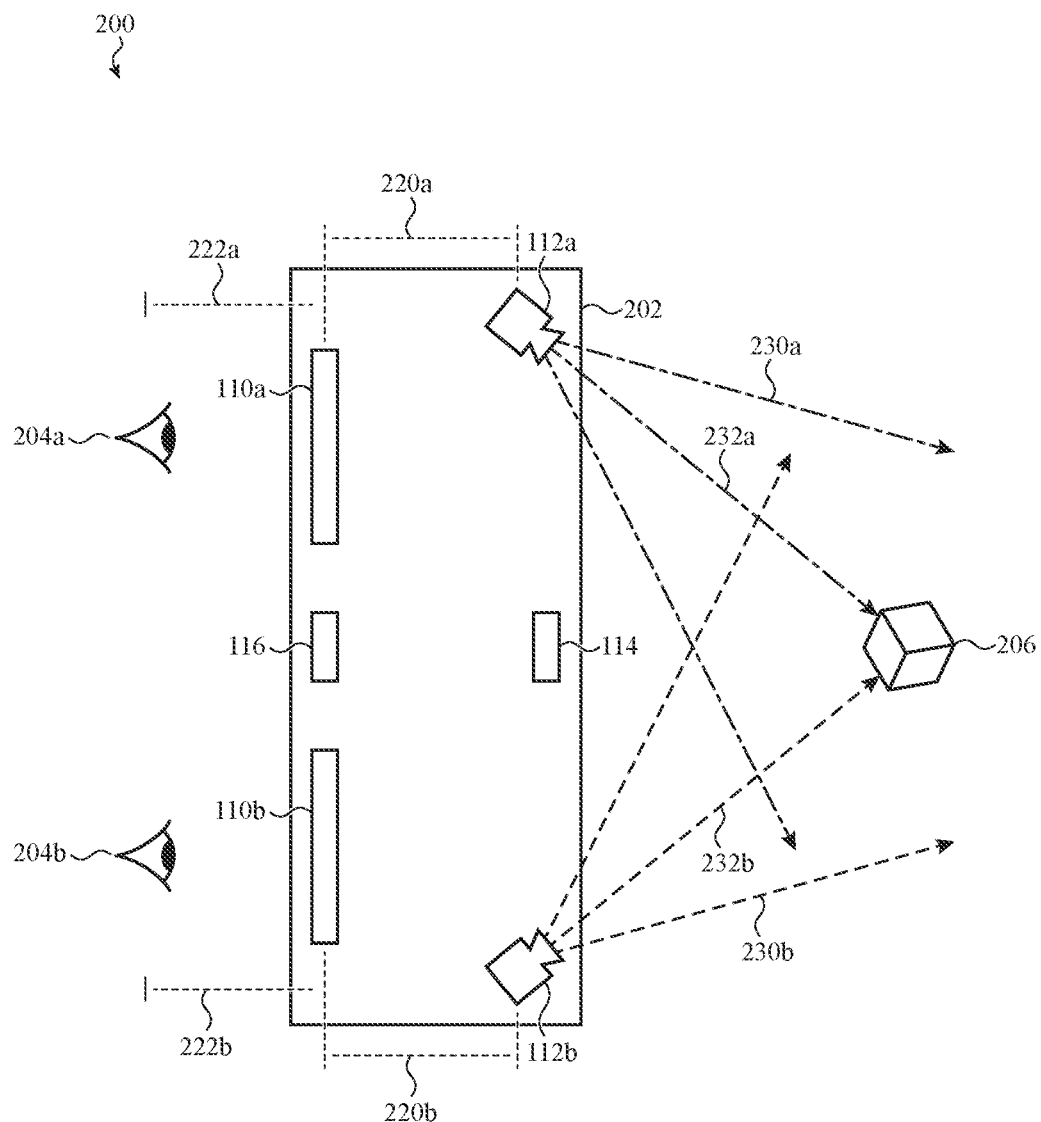
FIG. 2 shows an example operating environment that includes a variation of an electronic device as described herein.

FIG. 2 illustrates an operating environment 200 that includes an electronic device 202 that may be part of the extended reality systems to perform the processes described herein. The electronic device 202 may be configured in any manner as described above with respect to the electronic device 100 of FIG. 1. For example, the electronic device 202 may include a set of cameras that includes a first camera 112a and a second camera 112b, and a set of displays that includes a first display 110a and a second display 110b. Additionally, the electronic device 202 is shown as including a depth sensor 114 and an eye tracker 116, such as described herein.

The first camera 112a has a first field of view 230a and is positioned to capture images of a first portion of the physical environment surrounding the electronic device 202. Similarly, the second camera 112b has a second field of view 230b and is positioned to capture images of a second portion of the physical environment surrounding the electronic device 202. The first field of view 230a and the second field of view 230*b* may at least partially overlap, such that the first and second cameras 112*a*, 112*b* may concurrently capture a common portion of the physical environment surrounding the electronic device 202. For example, the operating environment 200 shown in FIG. 2 includes a real-world object 206 that is positioned in both the first field of view 230*a* and the second field of view 230*b*. Accordingly, when the electronic device 202 is positioned as shown in FIG. 2, images captured by the both of the first and second cameras 112*a*, 112*b* will include the real-world object 206.

As described in more detail herein, images captured by the first and second cameras 112*a*, 112*b* may be displayed via the set of displays as part of an extended reality environment to provide a user with a representation of their physical environment (e.g., as part of a passthrough mode). For example, images captured by the first camera 112*a* may be displayed on the first display 110*a* (e.g., as part of an extended reality environment), and may be viewed by a first eye 204*a* of a user, such as when the electronic device 202 is worn on or otherwise held near the head of the user. Similarly, images captured by the second camera 112*b* may be displayed on the second display 110*b* (e.g., as part of the extended reality environment), and may be viewed by a second eye 204*b* of the user.

Depending on the relative positioning between components of the electronic device 202, as well as the relative positioning between the electronic device 202 and the eyes 204*a*, 204*b* of the user, images captured by the first camera 112*a* and the second camera 112*b* may provide a different point-of-view of the operating environment 200 than if the user were to directly view their physical environment without the electronic device 202. Specifically, the set of cameras may be spatially offset from the set of displays in one or more directions. For example, an imaging plane of the first camera 112*a* may be separated from the first display 110*a* by a distance 220*a* along a first (e.g., horizontal) direction, and an imaging plane of the second camera 112*b* may be separated from second display 110*b* by a distance 220*b* along the first direction. The imaging planes of the first and second cameras 112*a*, 112*b* may, in some instances, also be rotated relative to the first and second displays 110*a*, 110*b*, respectively.

Additionally, the first and second eyes 204*a*, 204*b* may be separated from the first and second displays 110*a*, 110*b* by corresponding distances (e.g., a first eye-to-display distance 222*a* between the first display 110*a* and the first eye 204*a* and a second eye-to-display distance 222*b* between the second display 110*b* and the second eye 204*b*). The first camera 112*a* is separated by a first reference point (represented by object 206 in FIG. 2) by a first scene distance 232*a*, and the second camera 112*b* is separated by a second reference point (which may be the same point or a different point than the first reference point) by a second scene distance 232*b*. The offset (spatial and/or rotational) between the first camera 112*a* and the first display 110*a*, the first eye-to-display distance 222*a*, and the first scene distance 232*a* may collectively characterize the difference between the point-of-view of the first eye 204*a* and the point-of-view of the first camera 112*a* with respect to the first reference point. Similarly, the offset between the second camera 112*b* and the second display 110*b*, the second eye-to-display distance 222*b*, and the second scene distance 232*b* may collectively characterize the difference between the point-of-view of the second eye 204*b* and the point-of-view of the second camera 112*b* relative to the second reference point.

Accordingly, it may be desirable to adjust images captured by the set of cameras to account for these point-of-view differences (e.g., to generate perspective-corrected images) before they are displayed, which may reduce user discomfort as they view these images. These point-of-view adjustments, however, may not be desirable in instances where a user wishes to utilize the set of cameras to capture images or videos (e.g., to save for later viewing or to share with others). These captured images may later be viewed by a different device (which may have a different configuration than device 202), viewed from a different point-of-view (e.g., by a different user or with the user positioned at a different distance from the device), and/or may be viewed in a particular manner within an extended reality environment (e.g., viewed within a viewing window or frame within the extended reality environment). Presenting the perspective-corrected images in these instances may lead to an undesirable user experience, and further adjusting these images to account for a new viewing environment may undesirably introduce or amplify artifacts.

The process described herein includes obtaining a set of images from one or more cameras (e.g., one or more of the set of cameras of the electronic devices 100, 202 of FIGS. 1 and 2), and processing these images using multiple separate image processing pipelines. Specifically, a first image processing pipeline generates images that may be displayed by a set of displays, while a second image processing pipeline generates a set of output images that may be stored for later viewing or shared with others. The first and second image processing pipelines may receive the same images as inputs, but will utilize different image processing techniques that are tailored for their respective outputs.

As least some of the set of images are captured during a media capture event. Specifically, the set of cameras may be used to capture images during one or more photography modes (e.g., a photo mode that can capture still images, a video mode that may capture videos, a panoramic mode that can capture a panoramic photo, a portrait mode that can capture a still photo having an artificial bokeh applied, or the like). In general, during these modes, the device may display (e.g., via the set of displays of the electronic devices 100, 202 of FIGS. 1 and 2) a camera user interface that displays a "live preview." The live preview is a stream of images captured by the set of cameras and presented in real-time, and may represent the field of view (which may be a subset of the field of view of the camera) that will be captured when the camera initiates a media capture event. In other words, the live preview allows a user to see what portion of the scene is currently being imaged and to decide when to capture a photo or video.

The live preview may be presented to the user as part of an extended reality environment, in which the extended reality environment is operating in a passthrough mode. In these instances, at least a portion of the extended reality environment includes a reproduction of the user's physical environment, thereby allowing a user to perceive their physical environment and understand what portion of a scene will be captured during a media capture event. The extended reality environment may include one or more graphical user elements or other features (e.g., a transition, such as a transition between the reproduction of the physical environment and virtual content or a modified representation of the physical environment, that indicates a boundary of images to be captured by the device) to help guide a user in capturing images.

When the extended reality system initiates a media capture event, the set of cameras will capture images and generate media depending on the current photography mode (e.g., capture and generate a still photo when in a photo mode or capture and generate a video when in a video mode), which may then be stored locally on the device 100 (e.g., in a non-transitory computer-readable storage device as part of the memory 108), transmitted to a remote server for storage, or transmitted to another system (e.g., as part of a messaging or streaming application). It should be appreciated that in some instances there may be a frame buffer of images captured by the set of cameras, and that some images that were collected before the initiation of the media capture event may be used in generating the captured media that is stored or transmitted.

A media capture event may be initiated when an electronic device as described herein receives a capture request. The capture request may be received under some predetermined conditions (e.g., a software application running on the device may, with appropriate user permissions, automatically request that the set of cameras initiate a media capture event when certain criteria are met) or when a user gives a command to initiate the media capture event command by interacting with a shutter control on a user interface, pressing a designated button on the electronic device, giving a voice command, or the like.

Figure 3:
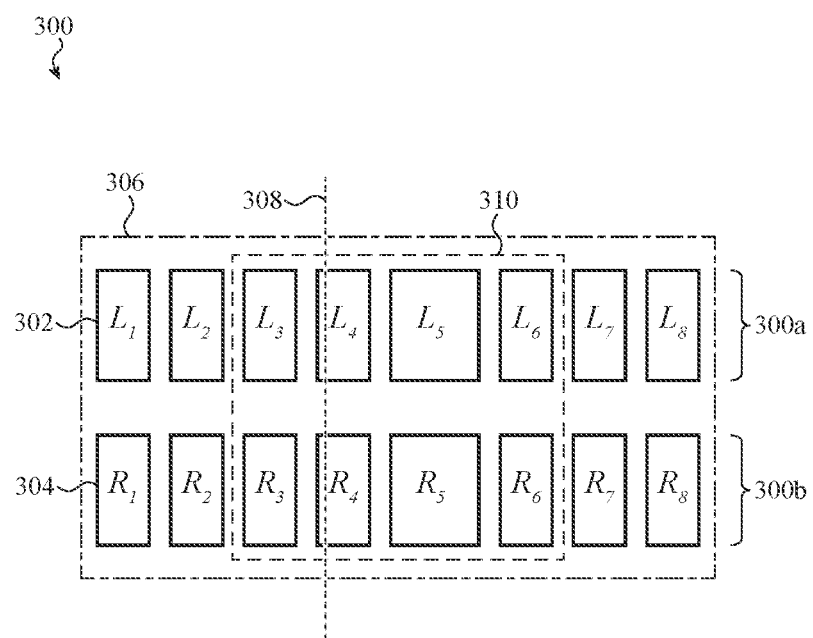
FIG. 3 shows an example of an image stream.

The processes described herein may be performed as part of a media capture event, and may utilize a first image processing pipeline to generate the live preview images that are displayed to the user, and a second image processing pipeline to generate the captured media that is stored or transmitted. For example, FIG. 3 shows an example image stream 300 that includes a sequence of images of a scene that are captured by a set of cameras of a device (e.g., the set of cameras of the electronic devices 100, 202 of FIGS. 1 and 2). In an example where the set of cameras includes two cameras, the image stream 300 includes a first camera image stream 300a of images 302 captured by a first camera (e.g., the first camera 112a of the electronic device 202 of FIG. 2) and a second camera image stream 300b of images 304 captured by a second camera (e.g., the second camera 112b of the electronic device 202 of FIG. 2).

The set of cameras may continuously capture the image stream 300 during operation of the electronic device, or may initiate the capture of the image stream 300 in response to certain conditions (e.g., the device entering a passthrough mode). When the image stream 300 includes multiple camera image streams (e.g., the first and second camera image streams 300a, 300b), images from each of the camera streams (such as concurrently captured images from different cameras) may be grouped and processed together. For example, the image stream 300 may include a series of image pairs, where each image pair includes a first image captured by the first camera (e.g., an image from the first camera image stream 300a) and a second image captured by the second camera (e.g., an image from the second camera image stream 300b).

For example, FIG. 3 shows the image stream 300 as including sixteen total images (eight images 302 labeled $L_1$-$L_8$ in the first camera image stream 300a and eight images 304 labeled $R_1$-$R_8$ in the second camera image stream 300b), and thus would have eight image pairs (a first pair of images including images $L_1$ and $R_1$, a second pair of images including images $L_2$ and $R_2$, and so on). The set of cameras may continue to capture the image stream 300 for as long as needed to perform any media capture events as may be desired. A predetermined number of images (or image pairs) from the image stream 300 may be temporarily stored in a buffer at a given time (e.g., with new images replacing the oldest images in the buffer), thereby allowing a certain number of recently captured images to be available to the device at any given time during capture of the image stream 300.

The processes described here may select a first set of images 306 (or image pairs) from the image stream 300, and a set of live preview images will be generated using the first set of images 306, as described in more detail below. It should be appreciated that when a process as described herein is used to select a set of images for additional image processing (e.g., to generate images therefrom), the process need not wait for all of the images to be selected before initiating this image processing. Using the first set 306 of images as a non-limiting example, the device may begin generating live preview images from images $L_1$ and $R_1$ before other images from the first set 306 (such as images $L_7$, $L_8$, $R_7$ and $R_8$) have been captured. In other words, the first image processing pipeline may generate live preview images on an ongoing basis.

As shown in FIG. 3, a capture request 308 may be received during capture of the image stream (e.g., shown there as received during the capture of images $L_4$ and $R_4$). In response to receiving the capture request 308, a second set 310 of images or image pairs may be selected as part of a media capture event. The second set 310 of images may be used (e.g., by a second image processing pipeline) to generate a set of output images that forms the captured media stored or transmitted as discussed herein. In some instances, as mentioned previously, the second set 310 of images may include one or more images or images pairs (e.g., images $L_3$ and $R_3$) that were captured prior to the capture request 308. The number of images 310 selected to be in the second set 310 may be predetermined (e.g., certain photography modes may select a specific number of images associated with each capture request 308) or dynamically determined (e.g., in a video mode, the number of images in the second set 310 may depend on when a termination request is received that stops the media capture event, thereby allowing a user to capture videos of varying lengths). In some variations, the receipt of the capture request 308 may optionally prompt the set of cameras to temporarily change one or more operating parameters while capturing images. For example, in response to receiving the capture request 308 the set of cameras may change the frame rate at which images are captured, or may intentionally change the exposure time of one or more images (e.g., the image pair that includes images $L_5$ and $R_5$ is shown as being captured with a longer exposure time than the surrounding image pairs).

Figure 4:
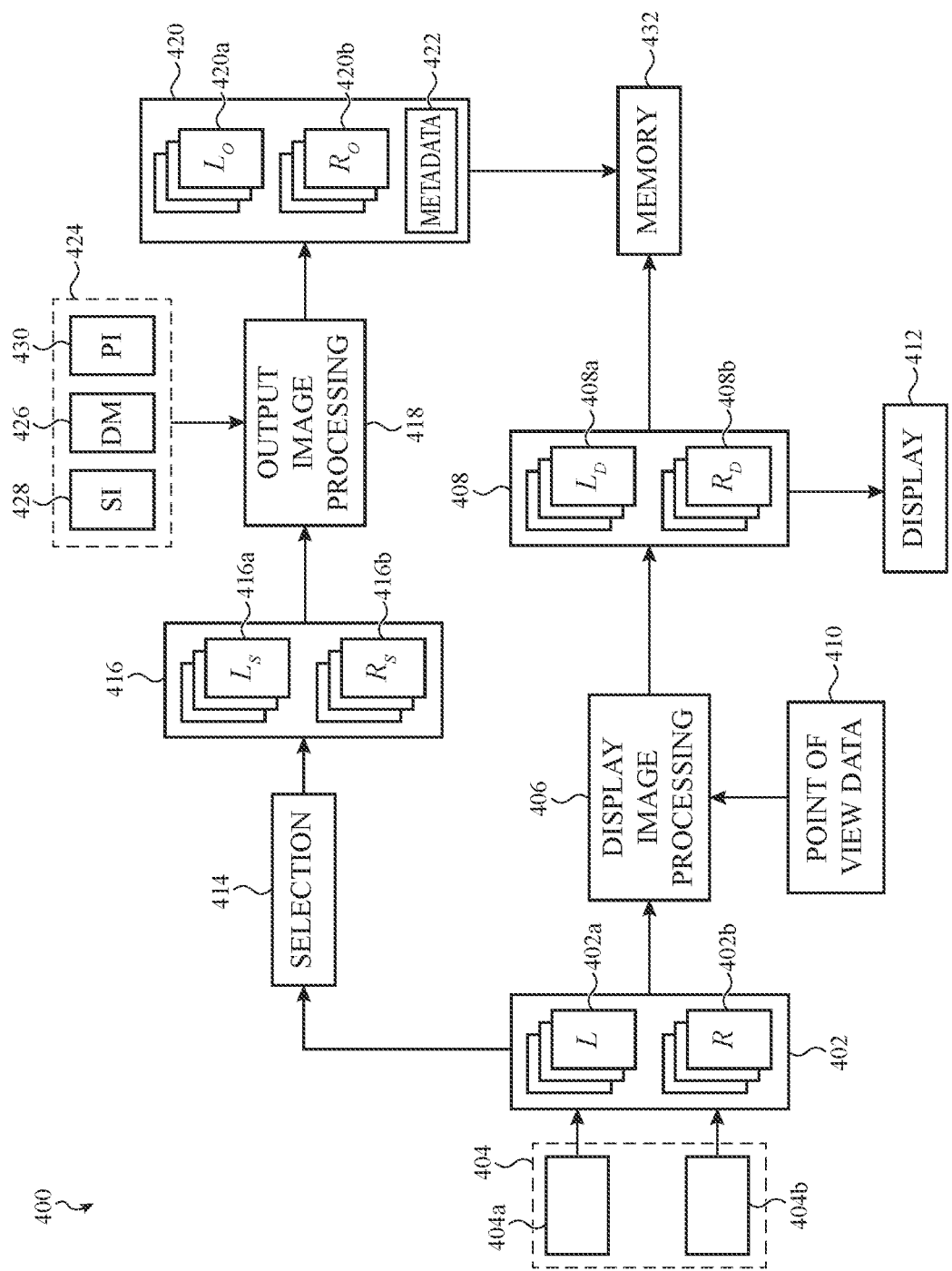
FIG. 4 depicts a process of separately processing images of an image stream using a display image processing pipeline and an output image processing pipeline.

Some or all of images used to generate output images as part of a media capture event (e.g., the second set 310 of images) may also be used to generate the live preview images that are displayed to a user (e.g., via the first set 306 of images). Accordingly, the different image processing pipelines may receive the same images as inputs, but will generate multiple different images using different image processing techniques. For example, FIG. 4 depicts a variation of a process 400 that uses multiple image processing pipelines to generate a first set of transformed images for displaying to a user (e.g., as part of live preview in an extended reality environment) and a second set of transformed images that are used to generate one or more output images as part of a media capture event. The blocks performed as part of process 400 may be performed as a method, or may be stored as instructions on a non-transitory computer-readable storage device, such that a processor may utilize these instructions to perform the various blocks of the processes described herein. Similarly, the devices described herein include a memory (e.g., memory 108) and one or more processors (e.g., processor 106) operatively coupled to the memory, where the one or more processors are configured to execute instructions that cause the one or more processors to perform the blocks of process 400.

Specifically, the process 400 captures an image stream 402 using a set of cameras 404. In some instances, the set of cameras 404 includes a first camera 404a and a second camera 404b, and the image stream 402 includes images 402a captured by the first camera 404a and images 402b captured by the second camera 404b. In these instances, the image stream 402 may form a series of image pairs, where each image pair includes a first image captured by the first camera 404a and a second image captured by the second camera 404b.

The process 400 includes display image processing pipeline 406 that is configured to generate a first set of transformed images 408 from images of the image stream 402 (such as, for example, the first set of images 306 from the image stream 300 of FIG. 3). As part of generating the first set of transformed images 408, the display image processing pipeline 406 may apply a first transformation operation to images of the image stream 402. In some instances, this first transformation operation includes a perspective correction operation in which images are transformed based on a difference between a point-of-view of one of the set of cameras 404 and a point-of-view of a user. In these instances, the display image processing pipeline 406 may receive and utilize point-of-view data 410, which represents the information about the points-of-view of the set of cameras 404 and the user. Perspective correction operations will be described in more detail herein with respect to FIG. 5.

For each image of the image stream 402 that is inputted to the display image processing pipeline 406, the display image processing pipeline 406 may generate a corresponding transformed image of the first set of transformed images 408. For example, the images 402a captured by the first camera 404a may be used to generate a first subset 408a of these transformed images 408 and the images 402b captured by the second camera 404b may be used to generate a second subset 408a of the transformed images 408. Accordingly, the first set of transformed images 408 may include a first set of transformed image pairs, wherein each image pair of the image stream 402 is used to generate a corresponding transformed image pair of the first set of transformed image pairs.

At step 412, the first set of transformed images are displayed on a set of displays (e.g., the set of displays of 110 of the electronic device 100 of FIG. 1). The first set of transformed images may be displayed as part of an extended reality environment (e.g., in a passthrough mode), which may provide a live preview such as discussed herein. In instances where the set of displays includes a first display and a second display (such as the first and second displays 110a, 110b of the electronic device 202 of FIG. 2), the first subset 408a of transformed images 408 may be displayed on the first display and the second subset 408b of transformed images 408 may be displayed on the second display. In this way, a first eye of the user may view images captured by the first camera (via the first display) and a second eye of the user may view images captured by the second camera (via the second display). In instances where the set of displays includes a single display, each transformed image pair may be simultaneously displayed on the single display. For example, a first transformed image of a pair may be displayed on a first portion of the display (where it may be viewed by a first eye of the user) while the second transformed image of the pair may be displayed on a second portion of the display (where it may be viewed by a second eye of the user). In some instances, the display image processing pipeline 406 may add virtual content to the transformed images, such that the user may view this virtual content as the transformed images are displayed to the user at block 412.

Additionally, a capture request may be received during while the image stream 402 is being captured. At block 414, a set of images 416 is selected from the image stream 402 in response to the receipt of the capture request (e.g., the second set 310 of images from the image stream 300 of FIG. 3). The selected set of images 416 includes one or more images captured after the capture request is received, and in some instances may also one or more images captured before the capture request was received, such as described above with respect to FIG. 3. The selected set of images 416 may include a first subset of images 416a that were captured by the first camera 404a (e.g., selected from the images 402a) and a second subset of images 416b that were captured by the second camera 404b (e.g., selected from the images 402b). Accordingly, the selected set of images 416 may include a selected set of image pairs, where each image pair includes a first image captured by the first camera 404a and a second image captured by the second camera 404b.

The process 400 may utilize an output image processing pipeline 418 that is configured to generate a set of output images 420 using the selected set of images 416. In some instances, the set of output images 420 includes a first subset of output images 420a that is generated from the first selected subset of images 416a and a second subset of output images 420b that is generated from the second subset of images 416b. Accordingly, the set of output images 420 may include a set of output image pairs. These output image pairs may include one or more stereo images and/or a stereo video. In stereoscopic imaging, two images taken from different perspective can, when presented to different eyes of a user, allow the user to perceive depth. Accordingly, a stereo image represents a single image pair that may later be presented to a user as a three-dimensional still image, whereas a stereo video represents a series of image pairs that may later be sequentially presented to a user as a three-dimensional video. Depending on the photography mode, the set of output images 420 may include a single stereo image, multiple stereo images (e.g., generated as part of a burst photography mode), only a stereo video, or a combination of stereo images and stereo videos. In instances where the set of output images 420 includes both a stereo image and a stereo video, the stereo image may be presented to the user as a three-dimensional image, but may also play a stereo video clip associated with the stereo image.

As part of generating the set of output images 420, the output image processing pipeline 418 may generate a second set of transformed images (not shown) from the selected set of images 416. The second set of transformed images may be used to generate the output images 420. In some instances, the output image processing pipeline 418 applies a second transformation operation, different than the first transformation operation applied by the display image processing pipeline 406, to images of the image stream 402. In this way, while the display image processing pipeline and the output image processing pipeline may at times receive the same images for processing, they will separately process these input images (e.g., in parallel) to provide different outputs. In some variations, the second transformation operation includes an image rectification operation, such as described in more detail with respect to FIG. 6.

In some instances, the output image processing pipeline 418 is also configured to generate metadata 422 associated with the set of output images 420. This metadata, examples of which will be described in more detail below with respect to FIG. 7, may be stored with the set of output images 420. The output image processing pipeline 418 may also receive contextual information 424 in addition to the selected set of images 416. The contextual information 424 may include information about the device (or components thereof such as the set of cameras) and/or the scene while capturing the image stream 404.

For example, in some variations the contextual information 424 includes a depth map 426. The depth map 426 includes a matrix of pixels, where each pixel corresponds to a respective location in the scene imaged by the set of cameras, and has a respective depth value representing a distance between the device (or a portion thereof, such as an individual camera of the set of cameras) and a respective location in the scene. In some instances, the depth map 426 may be derived from depth information generated by a depth sensor, in instances where the device includes a depth sensor (e.g., depth sensor 114 of the electronic devices 100, 202 of FIGS. 1 and 2). Additionally or alternatively, the depth map 426 may be derived from image analysis of an image (or images) captured by one or more camera of the device, such as one or more images of the image stream 402. In these instances, the image(s) may be analyzed using monocular or stereoscopic depth estimation techniques to estimate depth information for different portions of the scene. It should also be appreciated that the output image processing pipeline 418 may receive multiple depth maps, such as a first depth map for the first camera 404a (which represents scene distances relative to the first camera 404a), and a second depth map for the second camera 404b (which represents scene distances relative to the second camera 404b).

Additionally or alternatively, the contextual information 424 may include information about the content of the scene captured by the selected set of images 416. For example, the contextual information 424 may include a scene information map 428. Specifically, the scene information map 428 includes a matrix of pixels, where each pixel corresponds to a respective location in the scene and has a respective identifier indicating the type of object present at that location (and optionally, a confidence value associated with the identifier). For example, a scene information map 428 may be configured to identify locations of the scene that include human faces, such that each pixel of the scene information map indicates whether a face is present at the respective location in the scene, or includes a value (such as a normalized value between zero and one) representing the confidence that a face is present at the respective location the scene. In some variations, the contextual information 424 may include multiple scene information maps (each of which is associated with a different type of object), or may include a single scene information map 428 that may indicate the presence of multiple types of objects (e.g., people, animals, trees, or the like) in the scene.

Specifically, the scene information map 428 (or maps) may provide an understanding of the content of the scene, which may be used in generating the set of output images 420 and/or metadata 422. For example, the output image processing pipeline may be configured to apply different image processing techniques to people in the scene as compared to other objects present in the scene. Additionally or alternatively, the scene information map 428 (or maps) may be used to select a default disparity value that is included in metadata 422 and that may later be used (e.g., when displaying the output images) to control the disparity at which the output images are displayed (e.g., in a viewing region within an extended reality environment).

The scene information map 428 may be generated in any suitable manner. For example, some or all of the selected set of images 416 and/or the depth map 426 may be analyzed, such as using image segmentation and/or image classification techniques as will be readily understood by someone of ordinary skill in the art. These techniques may be used to look for a set of predetermined objects within the scene, the selection of which may be set based on user preferences, a photography mode that is active when the selected set of images 416 is captured, and/or a desired effect selected by the user that will applied to generate the set of output images 420. In some variations, the scene information map 428 may be based, at least in part, on user input. For example, the user may identify a region of interest of the scene (e.g., by determining a user's gaze as it relates to the scene, by determining a user's gesture as it relates to the scenes, other user inputs, combinations thereof, or the like), and one or more objects may be identified in the region of interest to generate a scene information map 428.

Additionally or alternatively, the contextual information 424 may include pose information 430 associated with the device (or one or more components thereof). The pose information 430 may include the position and/or orientation of the device during capture of the selected set of images 416. This may be used to generate similar pose information associated with the set of output images 420. The pose information associated with the set of output images 420 may be stored as metadata 422, and may later be used (e.g., when displaying the output images) to control a position and/or orientation at which the output images are displayed (e.g., in an extended reality environment).

At block 432, the set of output images 420 (including metadata 422 in instances where the set of output images 420 is associated with such metadata 422) may be stored in a non-transitory computer-readable storage device (e.g., as part of the memory 108 of the electronic device 100 of FIG. 1). Additionally or alternatively, the set of output images 420 may be transmitted to a different device (e.g., as part of an e-mail, message, live stream or the like, or for remote storage). As part of storing and/or transmitting the set of output images 420, the set of output images 420 (including metadata 422 in instances where the set of output images 420 is associated with such metadata 422) may be encoded or otherwise written in a specified format. As a non-limiting example, stereo images may be written as a high efficiency image file format, such as a high efficiency image container (HEIC) file. As another non-limiting example, stereo videos may be written as a high efficiency video coding (HEVC) file, such as a multiview high efficiency video coding (MV-HEVC) file.

By separating processing of the image stream 402 between the display image processing pipeline 406 and the output image processing pipeline 418, these image processing pipelines may be tailored to generate different types of images. Accordingly the process can generate the first set of transformed images 408 in a manner that is tailored for real-time display of these images at block 412 (e.g., as part of a live preview and/or passthrough mode in an extended reality environment). These images may be discarded after they are presented to a user, or may be optionally stored in in a non-transitory computer-readable storage device (e.g., as part of the memory 108 of the electronic device 100 of FIG. 1) as part of block 432. Additionally, the process 400 can generate the set of output images 420 that may be tailored to a different intended viewing experience. For example, the set of output images 420 may be intended to be viewed on a different device (with the same or different configuration as the device that is used to perform process 400) and/or to be viewed as part of a particular user experience that has different viewing requirements than those of block 412.

It should be appreciated that the various blocks of the process 400 may occur concurrently and on an ongoing basis. For example, certain images of the first set of transformed images 408 may be displayed at block 412 at the same time as the display image processing pipeline 406 is generating other images of the first set of transformed images 408. This may also occur at the same time that the first and second cameras 404*a*, 404*b* are capturing images to be added to the image stream 402, and while the output image processing pipeline 418 is generating output images 420 as discussed herein.

Figure 5:
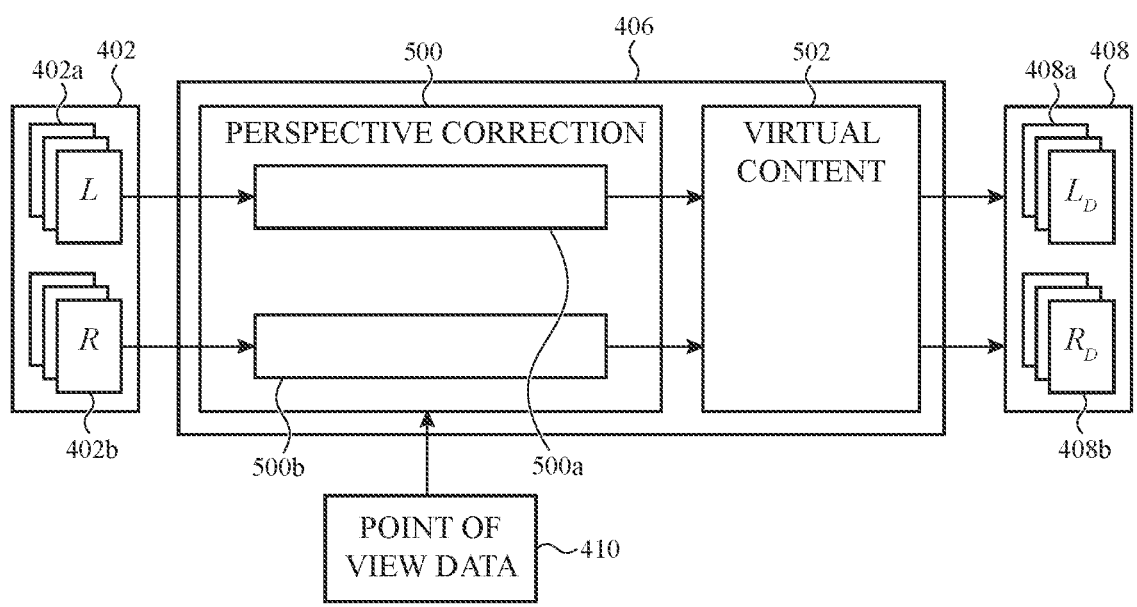
FIG. 5 depicts an example of a display image processing pipeline as described herein.

FIG. 5 shows a variation of the display image processing pipeline operation 406 of process 400. As shown there the display image processing pipeline 406 includes a perspective correction operation 500 that generates a set of perspective-corrected images from a set of images received by the display image processing pipeline 406 (e.g., images of the image stream 402). Generally, a perspective correction operation takes an image captured from one point-of-view (the "source point-of-view"), and transforms that image so it appears as if it were captured from a different point-of-view (the "target point-of-view"). Specifically, the perspective correction operation may utilize the user's point-of-view as the target point-of-view, and accordingly transforms the image so that it appears as if it were captured from the user's point-of-view. In this way, when the perspective-corrected images are displayed to the user at block 412 of process 400, objects presented in these images may appear at the same height and distance as the real-world objects in the user's physical environment. This may improve the accuracy with which the user's physical environment is reproduced in an extended reality environment as part of a passthrough and/or live preview mode.

The perspective correction operation 500 may utilize point-of-view data 410 to determine the source point-of-view (e.g., the point-of-view of the camera used to capture the image) as well as the target field of view (e.g., the point-of-view of the user or a particular eye of the user). For example, the point-of-view data 410 may include position information that includes one or more distances and/or angles that represent, respectively, the spatial and/or rotational offsets between the set of cameras and the set of displays (such as, for example, the first and second distances 220*a*, 220*b* described with respect to FIG. 2). In some instances, the offsets between the set of cameras and the set of displays may be known a priori (e.g., when the set of cameras and set of displays have a fixed spatial relationship) or may be dynamically determined by the device (e.g., when one of or more of the set of cameras and/or set of displays are moveable within the device).

The point-of-view data 410 may include information about a spatial relationship between the user and the device (or components thereof). This may include a single set of values that represents that relative positioning of both of a user's eyes to the device, or may include different sets of values for each eye (such as, for example, the first and second eye-to-display distances 222*a*, 222*b* described with respect to FIG. 2). The relative positioning between the user and the device may be determined, for example, using an eye tracker (such as eye tracker 116 of the electronic devices 100, 202 of FIGS. 1 and 2). Similarly, the point-of-view data 410 may include information about the scene being imaged by the set of cameras (such as distances from the device to a particular object in the scene). This may include distance information as determined by a depth sensor (e.g., depth sensor 114 of the electronic devices 100, 202 of FIGS. 1 and 2), by or more of the set of cameras, combinations thereof, or the like.

Collectively the point-of-view data 410 may be used to determine a difference between the source point-of-view and a target point-of-view for a particular image. The perspective correction operation 500 may apply a transformation (e.g., a homographic transformation or warping function) to an input image (e.g., an image of the image stream 402), using the difference between the source point-of-view and the target point-of-view, to generate a perspective-corrected image. Specifically, for each pixel of the input image at a pixel location in an untransformed space, a new pixel location for the perspective-corrected image is determined in a transformed space for the transformed image. Examples of perspective correction operations are discussed in more detail in U.S. Pat. No. 10,832,427 B1, titled "Scene camera retargeting", and in U.S. Pat. No. 11,373,271 B1, titled "Adaptive image warping based on object and distance information", the contents of which are hereby incorporate by reference in their entireties and are attached hereto as appendices.

In instances where the first set of images includes a set of image pairs, the perspective correction operation 500 includes a first perspective correction operation 500*a* and a second perspective correction operation 500*b*. For each image pair, the first perspective correction operation 500*a* generates a first perspective-corrected image from a first image of the image pair. Similarly, the second perspective correction operation 500*b* generates a second perspective-corrected image from a second image of the image pair. Specifically, the first perspective correction operation 500*a* may be applied to images 402*a* captured by the first camera 404*a*, and may generate perspective-corrected images based on a difference between a point-of-view of the first camera 404*a* and a point-of-view of the user (such as, for example, the point-of-view of a first eye of the user). Similarly, the second perspective correction operation 500*b* may be applied to images 402*b* captured by the second camera 404*b*, and may generate perspective-corrected images based on a difference between a point-of-view of the second camera 404*b* and a point-of-view of the user (such as, for example, the point-of-view of a second eye of the user).

The perspective-corrected images generated by the perspective correction operation 500 may form the first set of transformed images 408. In some instances, additional processing steps may be applied to these images. For example, at block 502 the display image processing pipeline 406 may add virtual content to the first set of transformed images 408, such as one or more graphical elements of a graphical user interface, virtual objects, or the like. This may allow the process to generate an extended reality environment with virtual content, and may allow the user to experience the virtual content as the first set of transformed images 408 is displayed to the user at block 412 of process 500. It should be appreciated that display image processing pipeline 406 may perform additional processing steps, such as cropping a portion of the images, as part of generating the first set of transformed images 408.

Figure 6:
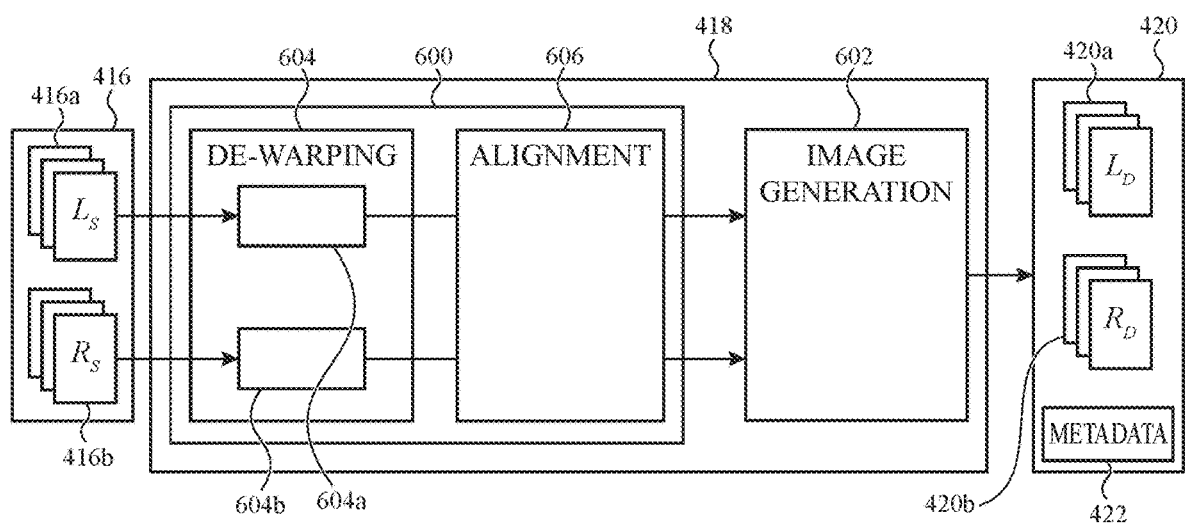
FIG. 6 depicts an example of an output image processing pipeline as described herein.

FIG. 6 shows a variation of the output image processing pipeline 418 of process 400. As shown there the output image processing pipeline 418 includes a transformation unit 600 that performs a transformation operation on images that are input into the output image processing pipeline 418 to generate a transformed image. Accordingly, the output image processing pipeline may be configured to generate a set of transformed images (e.g., a second set of transformed images different than the first set of transformed images 408 generated by the display image processing pipeline 406) from the selected set of images 416. An image generation unit 602 generates the set of output images 420 from this set of transformed images. The transformation operation performed by the transformation unit 600 may be different than the perspective-correction operation 500 utilized in the display image processing pipeline operation 406. For example, in some variations, the transformation unit 600 applies an image rectification operation that transforms images to project these images into a common target image plane. In the example of FIG. 6, transformation unit 600 includes a de-warping operation 604 and an alignment operation 606 that collectively perform an image rectification operation. In some instances, the set of cameras may have fisheye lenses or other similar optics designed to increase the fields of view of these cameras. While images captured by these cameras may be beneficial for reproducing three-dimensional environments (e.g., as part of an extended reality environment as described herein), these images typically include distortions when viewed as a two-dimensional image (e.g., object proportions may be altered and straight lines in the physical environment may appear as curves in the captured image).

Accordingly, the de-warping operation 604 may generate de-warped images to account for the lens distortions, as will be readily understood by someone of ordinary skill in the art. In other words, the image will be de-warped from its physical lens projection into a rectilinear projection, such that straight lines in three-dimensional space are mapped to straight lines in the two-dimensional image. For each image in the set of selected images 416 received by the output image processing pipeline 418, a first de-warping operation 604a may generate a first de-warped image from a first image of the image pair (e.g., one of the first subset 416a of images captured by the first camera 404a) and a second de-warping operation 604a may generate a second de-warped image from the second image of the image pair (e.g., one of the second subset 416b of images captured by the second camera 404b). To the extent that the first and second cameras 404a, 404b have different configurations (e.g., different fields of view and/or different lens designs), the first and second de-warping operations 604a, 604b may be tailored to the differences between these cameras.

For each image pair in the set of selected images 416, the alignment operation 606 may align the first and second de-warped images generated by the de-warping operation 604, such that the epipolar lines of the de-warped images are horizontally aligned. In this way, the transformation unit 600 may, for each image pair it receives, generate a transformed image pair that emulates having a common image plane (even though they may be captured by cameras having different image planes). These transformed image pairs may be used to generate the output images 420 via the image generation unit 602.

Figure 7:
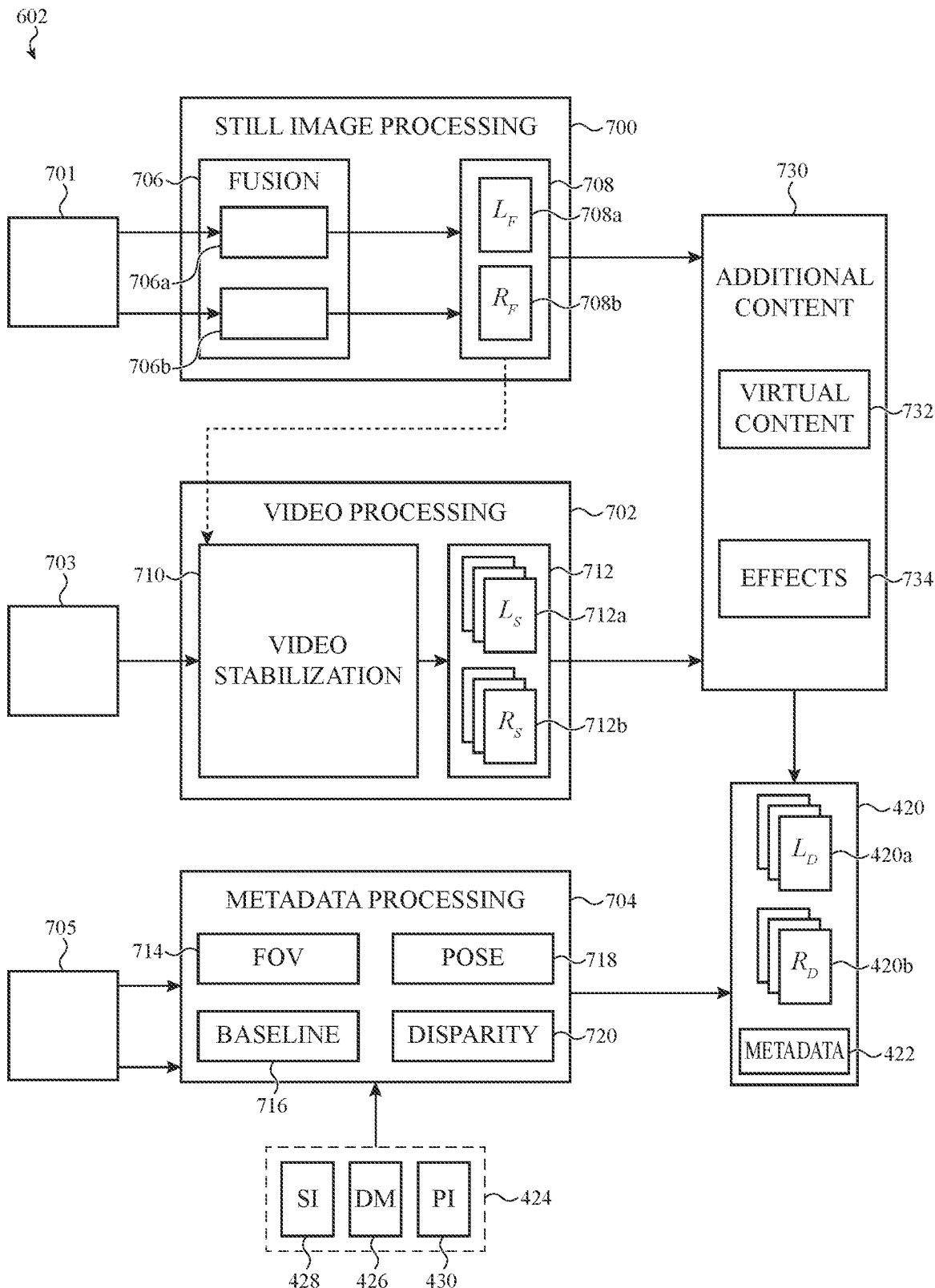
FIG. 7 depicts an example of an image generation unit that may be used as part of the output image processing pipelines described herein.

FIG. 7 shows a variation of the image generation unit 602, which is configured to generate the set of output images 420 as part of process 400. Optionally, the image generation unit 602 may also be configured to generate metadata 422 associated with the set of output images 420. As shown in FIG. 7, the image generation unit 602 includes a still image processing unit 700 configured to generate a set of still images, a video processing unit 702 that is configured to generate a video, and a metadata processing unit 704 that generates metadata associated with the output images. For a given media capture event, the output image processing pipeline 418 will use some or all of these when generating the set of output images 420, depending on the photography mode.

The still image processing unit 700 is configured to receive a first group of transformed images 701 (which may be some or all of the transformed images generated by the transformation unit 600), and may apply an image fusion operation 706 to generate one or more fused images 708 from two or more of the first group of transformed images 701. In instances where the transformed images 701 includes a set of transformed image pairs, the image fusion operation 706 generates one or more fused image pairs, which may form one or more fused stereo output images. In these instances a first fused image 708a of a fused image pair may be generated by applying a first image fusion operation 706a to a first subset of the transformed images 701 (e.g., which were all generated from images 416a captured by the first camera 404a). A second fused image 708b of a fused image pair may be generated by applying a second image fusion operation 706b to a second subset of the transformed images 701 (e.g., which were all generated from images 416b captured by the second camera 404b). Generally, an image fusion operation includes selecting a reference image from a group of selected images, and modifying some or all of its pixel values using information from the other selected images. The image fusion operation 706 may generate fused output images having reduce noise and/or higher dynamic range, and may utilize any suitable image fusion techniques as will be readily understood by someone of ordinary skill in the art.

The video processing unit 702 is configured to receive a second group of transformed images 703 (which may be some or all of the transformed images generated by the transformation unit 600), and may perform a video stabilization operation 710 on the second group of transformed images 703 to generate a stabilized video 712. In instances where the second group of transformed images 703 includes a set of image pairs, the stabilized video 712 may be a stereo video that includes a first set of images 712a (e.g., generated from images 416a captured by the first camera 404a) and a second set of images 712b (e.g., generated by images 416b captured by the second camera 404b). Accordingly, the video processing unit 702 may output a stereo video. In instances where the set output images 420 includes both a fused output image and a stereo video, the video processing unit 702 may optionally utilize one or more fused images 708 as part of the video stabilization operation 710 (e.g., the frames of the stereo video may be stabilized with respect a fused stereo image). The video stabilization operation 710 may utilize any suitable electronic image stabilization technique as will be readily understood by someone of ordinary skill in the art. In some instances, the video stabilization operation 710 may receive contextual information 424 (e.g., scene information, pose information, or the like) such as described above, which may assist in performing the video stabilization.

In some variations, the image generation unit 602 may optionally include an additional content unit 730 that is configured to add additional content to the still images generated by the still image processing unit 700 and/or the videos generated by video processing unit 702. For example, in some instances the additional content unit 730 may apply virtual content 732 (e.g., one or more virtual object) and/or other effects 734 (e.g., a filter, style transfer operation, or the like) to the output images generated by the image generation unit 602.

The metadata processing unit 704 is configured to generate metadata 422 associated with the set of output images 420. Depending on the type of metadata 422 that is being generated, the metadata processing unit 704 may receive a third group of images 705 (which may include some or all of the transformed images generated by the transformation unit 600, the output images generated by the transformation unit 600, and/or any of the images captured or generated as part of the process 400). Additionally or alternatively, the metadata processing unit 704 may receive contextual information 424, such as described herein, that may be used to generate the metadata 422.

In some variations the metadata processing unit 704 is configured to generate field of view information 714 for the set of cameras used to capture the selected set of images 416 used to generate the set of output images 420. This field of view information 714 may be fixed (e.g., in instances where the fields of view of the set of cameras are fixed), or may be dynamically determined (e.g., in instances where one or more of the set of cameras have optical zoom capabilities to provide variable fields of view). Additionally or alternatively, the metadata processing unit 704 is configured to generate baseline information 716 that represents one or more separation distances between the cameras of the set of cameras (e.g., a separation distance between the first camera 404a and the second camera 404b). Again, this information may be fixed (e.g., in instances where the set of cameras are in a fixed position relative to one another) or dynamically determined (e.g., in which one or more the set of cameras is moveable with a device housing the set of cameras).

In some instances, the metadata processing unit 718 is configured to generate pose information 718 associated with the set of output images. Specifically, the pose information 718 may described the pose of the output images, and thereby describe the relative position and/or orientation of the scene captured by the set of output images 420. This information may include or otherwise be derived from the pose information 430 associated with the underlying images (e.g., the selected set of images 416) that were used to generate the output images 420.

In some instances, the metadata processing unit 718 is configured to a set default disparity values 720 for a set of stereo output images. A default disparity value for a given stereo image represents a recommended disparity at which images of the stereo image be presented when viewing the stereo image (e.g., the distance at which these images are separated). Changing the disparity at which a stereo image is presented will impact how a user perceives the depth of the scene, and thus may be used to emphasize different portions of a scene captured by the set of output images 420.

In some instances, it may be desirable to select the set of default disparity values based on the scene captured by the set of output images 420. In these instances, contextual information 424, such as a scene information map 428, depth map 426, and/or pose information 430 may be used to select the set of default disparity values. This contextual information 424 may be associated with the set of output images 420 (e.g., generated from images or information that was captured concurrently with the selected images 416 used to generate the set of output images 420). This contextual information 424 may allow the metadata processing unit 704 to determine one or more aspects of the scene (e.g., the presence and/or location of one or more objects in the scene) captured by the set of output images 420, and select default disparity values based on these determinations.

The metadata 422 generated by the metadata processing unit 704 may include information that is applicable to all of the images of the set of output images and/or information that is specific to a particular image or image pair. For example, the metadata 422 may include pose information 718 for image or image of the output images 420, but may include a single set of baseline information 716 that applies to all of the output images 420. Similarly, the set of default disparity values 720 may include a single value that applies to every image pair of the set of output images 420, or may include different values for different image pairs (e.g., a first stereo image may have a first default disparity value and a second stereo image may have a second default disparity value).

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. One or more processors configured to:
receive an image stream from at least one camera;
apply a first transformation operation to images of the image stream;
output, for display, the images transformed using the first transformation operation;
receive a capture request to capture a set of stereo output images; and
generate, in response to receiving the capture request and while applying the first transformation and outputting the images transformed using the first transformation operation, the set of stereo output images, wherein generating the set of stereo output images comprises:
applying a second transformation operation different than the first transformation operation to a set of images from the image stream; and
generating, using the set of images transformed using the second transformation operation, the set of stereo output images, wherein:
the set of images transformed using the first transformation operation and the set of images transformed using the second transformation operation are generated from the same images.

2. The one or more processors of claim 1, wherein generating the set of stereo output images comprises:
generating a fused stereo output image from two or more image pairs of the set of images.

3. The one or more processors of claim 1, wherein the set of stereo output images comprises a stereo video.

4. The one or more processors of claim 3, wherein generating the set of stereo output images comprises:
performing a video stabilization operation on the set of images transformed using the second transformation operation.

5. The one or more processors of claim 1, wherein the first transformation operation is a perspective correction operation.

6. The one or more processors of claim 1, wherein the second transformation operation is an image rectification operation.

7. The one or more processors of claim 1, wherein generating the set of stereo output images comprises generating metadata associated with the set of stereo output images.

8. A method comprising:
generating, from an image stream received from at least one camera, a first set of transformed images by applying a first transformation operation to images of the image stream;
outputting, for display, the first set of transformed images;
receiving a capture request to capture a set of stereo output images; and
generating, in response to receiving the capture request while applying the first transformation and outputting the images transformed using the first transformation operation, the set of stereo output images, wherein generating the set of stereo output images comprises:
applying a second transformation operation different than the first transformation operation to a set of images from the image stream to generate a second set of transformed images; and
generating, using the second set of transformed images, the set of stereo output images, wherein:
the first set of transformed images and the second set of transformed images are generated from the same images.

9. The method of claim 8, wherein generating the set of stereo output images comprises generating metadata associated with the set of stereo output images.

10. The method of claim 9, wherein the metadata comprises pose information for the set of stereo output images.

11. The method of claim 9, wherein the metadata comprises field of view information of the at least one camera.

12. The method of claim 9, wherein the metadata comprises a set of default disparity values for the set of stereo output images.

13. The method of claim 12, wherein generating metadata associated with the set of stereo output images comprises selecting the set of default disparity values based on a scene captured by the set of stereo output images.

14. The method of claim 8, comprising adding virtual content to the first set of transformed images.

15. A non-transitory computer readable medium comprising instructions, which when executed by a processing unit, cause the processing unit to:
receive an image stream from at least one camera;
apply a first transformation operation to images of the image stream;
output, to at least one display, the images transformed using the first transformation operation;
receive a capture request to capture a set of stereo output images; and
generate, in response to receiving the capture request and while applying the first transformation operation and outputting the images transformed using the first transformation operation, the set of stereo output images, wherein generating the set of stereo output images comprises:
applying a second transformation operation different than the first transformation operation to a set of images from the image stream; and
generating, using the set of images transformed using the second transformation operation, the set of stereo output images, wherein:
the images transformed using the first transformation operation and the set of images transformed using the second transformation operation are generated from the same images.

16. The non-transitory computer readable medium of claim 15, wherein the first transformation operation is a perspective correction operation.

17. The non-transitory computer readable medium of claim 15, wherein the second transformation operation is an image rectification operation.

18. The non-transitory computer readable medium of claim 15, wherein generating the set of stereo output images comprises:
generating a fused stereo output image from two or more image pairs of the set of images.

19. The non-transitory computer readable medium of claim 15, wherein generating the set of stereo output images comprises generating metadata associated with the set of stereo output images.

20. The non-transitory computer readable medium of claim 19, wherein the metadata comprises field of view information associated with the image stream.

* * * * *